Figure 1:
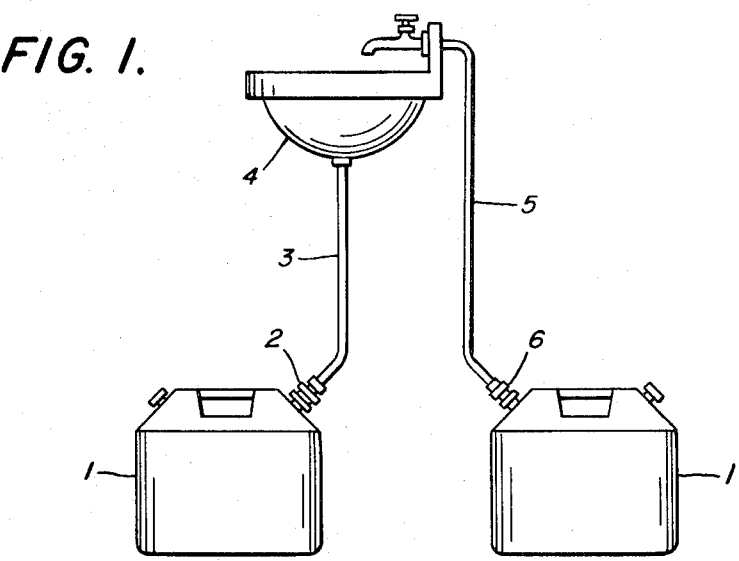

United States Patent [19]
Halferty

[11] 3,750,196
[45] Aug. 7, 1973

[54] WASTE WATER HOLDER SYSTEM
[75] Inventor: Donald William Halferty, Munster, Ind.
[73] Assignee: United States Steel Corporation, Pittsburgh, Pa.
[22] Filed: Dec. 23, 1971
[21] Appl. No.: 211,437

[52] U.S. Cl............................ 4/166, 4/1, 4/187 R, 285/169, 285/177
[51] Int. Cl.............................................. A47k 1/04
[58] Field of Search .................. 4/1, 166, 167, 170, 4/168–169, 145, 151, 152, 155, 154, 156, 187 R–190; 285/169, 177

[56] References Cited
UNITED STATES PATENTS

| | | | |
|---|---|---|---|
| 2,562,294 | 7/1951 | Cahenzli, Jr. | 285/177 |
| 2,787,480 | 4/1957 | Staller | 285/177 X |
| 3,293,664 | 12/1966 | Coons | 4/155 |
| 3,154,632 | 10/1964 | Browne | 285/169 X |
| 3,657,746 | 4/1972 | Downey | 4/155 |
| 3,681,788 | 8/1972 | Le Blanc et al. | 4/153 |

Primary Examiner—Henry K. Artis
Attorney—Gene Harsh and John E. Callaghan

[57] ABSTRACT

The invention concerns a portable waste water disposal system which has a plastic container as a reservoir for the waste water. A liquid and vapor tight seal to the source of waste water is provided for the container. The system may be used in campers or other recreational vehicles.

9 Claims, 2 Drawing Figures

PATENTED AUG 7 1973                                    3,750,196

WASTE WATER HOLDER SYSTEM

BACKGROUND OF THE INVENTION

With recreational vehicles such as campers, it has been the practice to discharge waste water upon adjacent grounds. There is a need for a portable waste water disposal system that is safe and sanitary. The system needs to be easily detached when full, emptied and re-attached repeatedly while also having a liquid and vapor tight seal during operation.

OBJECTS OF THE INVENTION

This invention is intended to provide a waste water disposal system with a readily portable plastic reservoir for such water that has a vapor and liquid tight seal when in use. Further, among the objects of this invention is to provide as members of such a waste water system, a plastic reservoir with a coupling means which can create such a seal and that can be repeatedly disengaged without loss of its sealing capability. It is also to provide coupling means with the reservoir which coupling means can be removed as an integral unit from its plastic reservoir. This coupling means is also constructed to receive commonly available plumbing fittings. In combination with a container of like design but oppositely constructed coupling means, the system includes such containers as both a source of fresh water and a reservoir for waste water. In addition, the invention provides recreational vehicles having a waste water disposal system with a readily portable plastic reservoir for such water of the kind previously described. Moreover, this waste water disposal system may be mounted interiorly of the recreational vehicle.

DESCRIPTION OF THE INVENTION AND FIGURES

According to the invention, there is a waste water disposal system having a source of waste water, a plastic reservoir for the water and a coupling carrying the water into the reservoir. This coupling creates a liquid and vapor tight seal between the reservoir and the source. Recreational vehicles having these waste disposal systems are a particularly suitable embodiment of the invention.

FIG. 1 illustrates in schematic form an embodiment of the invention in which there are plastic containers used as a source of fresh water and as a reservoir for waste water. A plastic container 1 for receipt of waste water has a coupling means 2 shown as a female to male connection to the waste water line 3. The waste water line carries off water from a source 4 such as a sink. The fresh water comes to the sink from a fresh water supply line 5 which has a coupling means 6 shown as a female to male connection to another plastic container 1 which is the source of fresh water.

In operation, the fresh water is drawn from its source by conventional methods such as mechanical pumps, hydraulic pressure or gravity flow. The water is used and discharged to the reservoir. Once the reservoir is filled, the coupling is broken and an empty reservoir may be connected to the waste water outlet. The filled reservoir may be capped and transported to common disposal facilities. Although one reservoir is illustrated, by providing a manifold and valving, several waste water outlet lines can be connected to a multiplicity of reservoirs that can be operated sequentially or concurrently.

It is a particular advantage of this invention that the waste water disposal system may be interiorly disposed, operated inside, in a recreational vehicle such as a mobile camper. The system will be securely closed even if it is subjected to motion incident to the driving of such a vehicle. The vehicle will normally have exterior venting means that may be connected to the venting means of the waste water system for discharge of noxious odors from the vehicle. As well, the waste water disposal system may be connected to outside drain lines from said vehicle.

Figure 2:
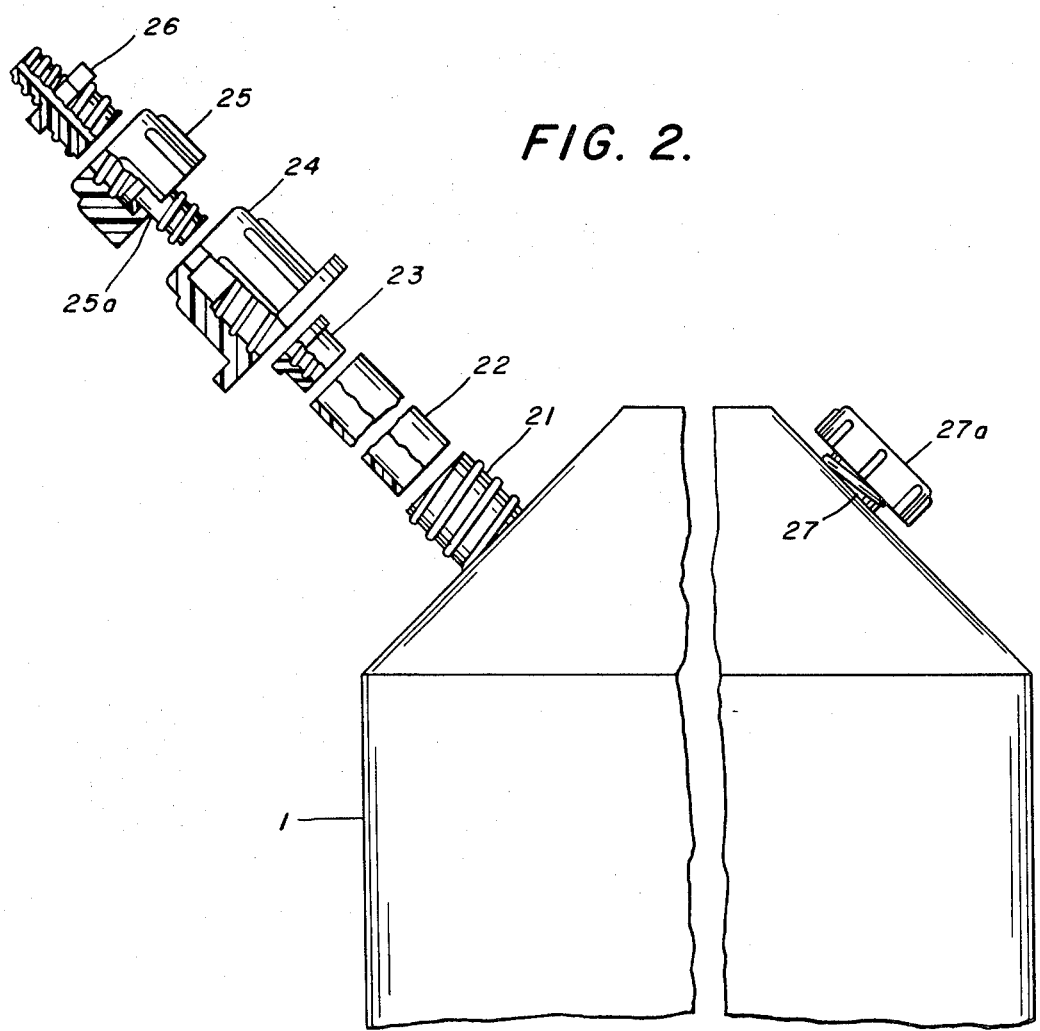

FIG. 2 is an exploded view of a container and coupling means according to the invention. There is a plastic container 1, preferably of blow molded single piece construction, which has a wide mouthed threaded opening 21. This opening may be at least 1⅜ inches I.D. A reservoir discharge means 22 in the form of a tube will carry the waste water into the container. This tube is of smaller diameter than the opening and will desirably extend almost to the bottom of the container so that a water trap is created to prevent backflow of vapors into the discharge lines. The reservoir discharge means is associated with a gasket means 23 shown here as a plug with a collar. These parts may have an interference fit to provide a tight fit. This gasket means will close the mouth of the container opening and be held against this opening by the compression means 24 shown as a threaded collar with an internal configuration to seat the gasket upon the opening. Connected to the gasket is an adapter means 25 which is shown here with a tube fitting that is inserted into a cylinder opening in the gasket. This adapter means 25 by its tight fit in the gasket means 23 causes the compression means 24 to be securely engaged with the discharge means 22. The central opening in the adapter means is a passageway for the waste water. A fitting on the adapter, shown as a female threaded portion, connects with a mating fitting portion 26 which is in turn connected to the waste water source.

When assembled, the gasket is tightly held to the container by the collar, the discharge tube is suspended from the gasket and the adapter by its fit into the gasket engages the collar. The tight fit of these elements in each other provides the liquid and vapor tight seal for the container. However, the adapter can have a swivel section which will be free to rotate for easy disengagement from its mating connection to the waste water source. Alternatively, the mating fitting portion can be freely rotatable for easy disengagement. A preferred embodiment is shown in which the adapter has a swivelled female portion for a mating male portion connected to the waste water source.

The assembled waste water disposal system may be disengaged by opening the connection at the adapter. Then, the entire trap assembly can be removed as an integral unit by releasing the compression means from the container. As long as the compression means is engaged with the container, then the waste water disposal system will have an operative water trap. Conversely, if the compression means is removed from the container, the concurrent removal of the integral structure of the entire assembly will cause the water trap to become inoperative.

The arrangement of fittings is such that the adapter leads to a wider cross sectional area in the gasket, which in turn leads to a wider cross sectional area in the discharge means. This flow path prevents entrainment of waste water.

The plastic container also has an atmospheric vent means 27 located near its top. This permits venting of vapors which collect above the surface of the liquid trap inside the container. A cap 27a loosened on the vent means can be used for ventilation of odors to the atmosphere.

For safety and to prevent accidents, it is preferred to have the adapter of the container for fresh water with a mating fitting to the adapter of the container for waste water. This prevents confusion of the containers.

While the compression means has been illustrated as a plain internally threaded collar, it may also have pawl means for engagement with ratchet means to provide a securely closed container, such constructions being more fully described in copending application Ser. No. 118,798 of Herbert W. Galer, filed Feb. 25, 1971, which disclosure is incorporated herein for reference.

The plastic container is preferably of one-piece blow-molded construction so that a smooth internal surface will be created. While the rectangular-shaped container with an integral mediately disposed handle is one form of container for the invention, other shapes such as cylinders may be used. A convenient capacity for the container is 5 to 6 gallons. High density polyethylene may be used to form the container, as well as other thermoplastic resins such as polypropylene, ABS resin, etc. may be used.

It is particularly advantageous to have all the elements for the container and coupling means made from synthetic resin material. The discharge means may be a thermoplastic such as ABS, the gasket means may be neoprene or a soft rubber. The coupling means and compression means can be injection molded thermoplastic such as high density polyethylene or polystyrene. While these elements may be separate parts, also they may be of molded integral construction.

The coupling means and vent means desirably have threaded portions of the garden hose (GH) type by which the container may be connected to a water supply for easy cleaning and filling. In addition, cap plugs and caps may be attached to these elements for closing off their respective openings when the container is removed from the waste water disposal system.

While this invention has been described in terms of a specific example, it is intended to include reasonable variations in materials, and arrangement of parts.

I claim:

1. Components for a waste water disposal system including in combination a portable molded plastic reservoir for said waste water and a coupling means to connect said reservoir to a source of waste water, said coupling means comprising in combination
a reservoir discharge means with a gasket means,
said reservoir discharge means disposed in said reservoir to form a water trap therein,
said gasket means being engaged with said reservoir by a compression means,
and an adapter means connected to said gasket means, said adapter means having passages for said waste water and having a fitting portion for connection with a mating fitting portion connected with said source,
at least one of said fitting portions being rotatable with respect to the other,
whereby said reservoir and said coupling means provide a vapor and liquid type seal for said waste water.

2. A waste water disposal system comprising a source of waste water and a portable molded plastic reservoir for said waste water, and including a coupling means for said reservoir and said source,
said coupling means comprising in combination
a reservoir discharge means with a gasket means,
said reservoir discharge means disposed in said reservoir to form a water trap therein,
said gasket means being engaged with said reservoir by a compression means,
and an adapter means connected to said gasket means, said adapter means having passages for said waste water and having a fitting portion connected with a mating fitting portion connected with said source,
at least one of said fitting portions being rotatable with respect to the other,
whereby said reservoir and said coupling means provide a vapor and liquid type seal for said waste water.

3. The system of claim 2 wherein said reservoir comprises a one-piece polyethylene container of about 5-gallon capacity.

4. The system of claim 2 wherein said fitting portions contain threaded connecting means.

5. The system of claim 4 wherein said threaded means comprise thread of the garden hose type.

6. The system of claim 5 wherein said fitting portion associated with said adapter comprises a rotatable threaded female portion.

7. The system of claim 2 wherein said reservoir means contain an atmospheric venting means.

8. A recreational vehicle having a portable waste water disposal system comprising a source of waste water and a portable molded plastic reservoir for said waste water, and including a coupling means for said reservoir and said source,
said coupling means comprising in combination
a reservoir discharge means with a gasket means,
said reservoir discharge means disposed in said reservoir to form a water trap therein,
said gasket means being engaged with said reservoir by a compression means,
and an adapter means connected to said gasket means, said adapter means having passages for said waste water and having a fitting portion connected with a mating fitting portion connected with said source,
at least one of said fitting portions being rotatable with respect to the other,
whereby said reservoir and said coupling means provide a vapor and liquid type seal for said waste water, and
whereby said coupling means provides an integral water trap means for said reservoir.

9. The combination of claim 8 wherein said waste water disposal system is disposed interiorly of said vehicle.

* * * * *